United States Patent
Toda (10) Patent No.: US 9,387,720 B2
(45) Date of Patent: *Jul. 12, 2016

(54) DISPLAY HAVING LIGHT-SCATTERING PROPERTY

(71) Applicant: TOPPAN PRINTING CO., LTD., Tokyo (JP)

(72) Inventor: Toshiki Toda, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 60 days.

This patent is subject to a terminal disclaimer.

(21) Appl. No.: 14/619,558

(22) Filed: Feb. 11, 2015

(65) Prior Publication Data

US 2015/0151561 A1 Jun. 4, 2015

Related U.S. Application Data

(63) Continuation of application No. 12/801,635, filed on Jun. 17, 2010, now Pat. No. 8,982,465, and a continuation of application No. PCT/JP2008/057611, filed on Apr. 18, 2008.

(51) Int. Cl.

| | |
|---|---|
| *G02B 5/18* | (2006.01) |
| *B42D 25/324* | (2014.01) |
| *G02B 5/02* | (2006.01) |
| *G09F 3/00* | (2006.01) |
| *B42D 25/425* | (2014.01) |
| *B42D 25/29* | (2014.01) |
| *B42D 25/328* | (2014.01) |
| *G02B 27/42* | (2006.01) |

(52) U.S. Cl.
CPC .............. *B42D 25/324* (2014.10); *B42D 25/29* (2014.10); *B42D 25/328* (2014.10); *B42D 25/425* (2014.10); *G02B 5/0221* (2013.01); *G02B 5/0263* (2013.01); *G02B 5/0278* (2013.01); *G02B 5/1861* (2013.01); *G02B 27/4205* (2013.01); *G09F 3/0292* (2013.01); *B42D 2033/04* (2013.01); *B42D 2033/18* (2013.01)

(58) Field of Classification Search
None
See application file for complete search history.

(56) References Cited

U.S. PATENT DOCUMENTS

| | | | |
|---|---|---|---|
| 4,589,686 | A | 5/1986 | McGrew |
| 5,808,758 | A | 9/1998 | Solmsdorf |
| 6,271,967 | B1 | 8/2001 | Stork |
| 6,906,861 | B2 | 6/2005 | Tompkin et al. |
| 8,982,465 | B2 * | 3/2015 | Toda .............................. 359/567 |
| 2004/0179266 | A1 | 9/2004 | Schilling et al. |

(Continued)

FOREIGN PATENT DOCUMENTS

| | | |
|---|---|---|
| EP | 1 855 127 | 11/2007 |
| JP | 5-273500 | 10/1993 |
| JP | 6-278396 | 10/1994 |
| JP | 8-62411 | 3/1996 |

(Continued)

OTHER PUBLICATIONS

Advisory Action mailed Jun. 14, 2011 in related U.S. Appl. No. 12/801,635.

(Continued)

*Primary Examiner* — Arnel C Lavarias (57) ABSTRACT

A display includes light-scattering regions. Each of the light-scattering regions is provided with linear protrusions and/or recesses having the same longitudinal direction. The light-scattering regions are different from each other in the longitudinal direction.

15 Claims, 7 Drawing Sheets

(56) References Cited

U.S. PATENT DOCUMENTS

| | | |
|---|---|---|
| 2005/0082819 A1 | 4/2005 | Tompkin et al. |
| 2006/0238664 A1 | 10/2006 | Uehara et al. |
| 2012/0127547 A1 | 5/2012 | Gocho et al. |

FOREIGN PATENT DOCUMENTS

| | | |
|---|---|---|
| JP | 8-272285 | 10/1996 |
| JP | 2000-131516 | 5/2000 |
| JP | 2002-328639 | 11/2002 |
| JP | 2002-333854 | 11/2002 |
| JP | 2002-341809 | 11/2002 |
| JP | 2003-98324 | 4/2003 |
| JP | 2005-24601 | 1/2005 |
| JP | 2005-326455 | 11/2005 |
| JP | 2006-308700 | 11/2006 |
| JP | 2008-83599 | 4/2008 |
| JP | 2008-107472 | 5/2008 |
| WO | WO 2007131375 | 11/2007 |
| WO | WO 2008/041580 | 4/2008 |

OTHER PUBLICATIONS

International Preliminary Report of Patentability; International Application PCT/JP2008/057611; PCT/IB/338; PCT/IB3/373; PCT/ISA/237; mailed Dec. 9, 2010.

Canadian Office Action for Corresponding Canadian application 2,708,526; dated Apr. 28, 2011.

International Search Report mailed Jul. 29, 2008 in corresponding PCT Application No. PCT/JP2008/057611.

U.S. Office Action mailed Dec. 7, 2010 in related U.S. Appl. No. 12/801,635.

U.S. Final Office Action mailed Apr. 1, 2011 in related U.S. Appl. No. 12/801,635.

U.S. Office Action mailed Aug. 24, 2011 in related U.S. Appl. No. 12/801,635.

U.S. Final Office Action mailed Jan. 25, 2012 in related U.S. Appl. No. 12/801,635.

U.S. Office Action mailed Jan. 15, 2013 in related U.S. Appl. No. 12/801,635.

U.S. Final Office Action mailed Aug. 6, 2013 in related U.S. Appl. No. 12/801,635.

U.S. Office Action mailed Jul. 15, 2014 in related U.S. Appl. No. 12/801,635.

U.S. Notice of Allowance mailed Nov. 12, 2014 in related U.S. Appl. No. 12/801,635.

U.S. Appl. No. 12/801,635, filed Jun. 17, 2010, Toshiki Toda, Toppan Printing Co., LTD., Tokyo, Japan.

* cited by examiner

DISPLAY HAVING LIGHT-SCATTERING PROPERTY

CROSS-REFERENCE TO RELATED APPLICATIONS

This application is a continuation of U.S. patent application Ser. No. 12/801,635, filed Jun. 17, 2010 and which is a Continuation application of PCT Application No. PCT/JP2008/057611, filed Apr. 18, 2008, which was published under PCT Article 21(2) in Japanese, the contents of all of the above being incorporated by reference herein.

BACKGROUND OF THE INVENTION

1. Field of the Invention

This invention relates to a display and a labeled article. This invention relates to, for example, a display which can be used for forgery-prevention of articles such as cards, securities and brand-name products and which displays an image by utilizing light-scattering, and to a labeled article including it.

2. Description of the Related Art

Generally, a pattern for displaying an image by light-scattering (hereinafter called a light-scattering pattern) is formed by subjecting a surface of a substrate to a relief-processing. The relief-processing method includes, for example, a method of etching a substrate, a method of roughening a surface of a substrate with a chemical, a method of forming relief on a surface of a substrate using an EB writer, or the like.

Among these method, according to the method utilizing etching and the method using a chemical, it is difficult to make a density of recesses and/or protrusions in a certain fine region different from that in another fine region, on a surface where the recesses and/or protrusions are to be formed. It is therefore difficult to make the degrees of scattering in those regions different from each other by controlling the densities of the recesses and/or protrusions. On the other hand, if the EB writer is used, the densities and shapes of recesses and/or protrusions to be formed in the fine regions can be controlled arbitrarily.

Jpn. Pat. Appln. KOKAI Publication No. 5-273500 describes a display on which a diffraction grating pattern and a light-scattering pattern are formed in the same surface using an EB writer. This display has the following effects.

(a) Since display does not rely on diffracted light alone, restrictions on observation conditions are small.

(b) Since the scattered light is also used for the display, an iridescent appearance is not the only impression that the image offers.

(c) Since both the diffraction grating pattern and the light-scattering pattern are constituted by the recesses and/or protrusions, those patterns can be formed by embossing and the alignment between those patterns is unnecessary.

However, a relief-type diffraction grating can be formed with relative ease by laser facilities, etc. In addition, a visual effect of the light-scattering pattern included in the above display can be obtained from, for example, a printed layer containing transparent particles and transparent resin having a refractive index different from that of the transparent particles. For this reason, the forgery-prevention effect of this display is not always considered sufficient.

BRIEF SUMMARY OF THE INVENTION

An object of the present invention is to realize a forgery-prevention technique for achieving a high forgery-prevention effect.

According to a first aspect of the invention, there is provided a display comprising light-scattering regions each provided with linear protrusions and/or recesses having the same longitudinal direction, the light-scattering regions being different from each other in the longitudinal direction.

According to a second aspect of the invention, there is provided a labeled article comprising the display according to the first aspect, and an article supporting the display.

DETAILED DESCRIPTION OF THE INVENTION

Embodiments of the present invention will be described below with reference to the accompanying drawings. The same reference symbols denote components having the same or similar functions throughout all of the drawings and their duplicated descriptions will be omitted.

Figure 1:
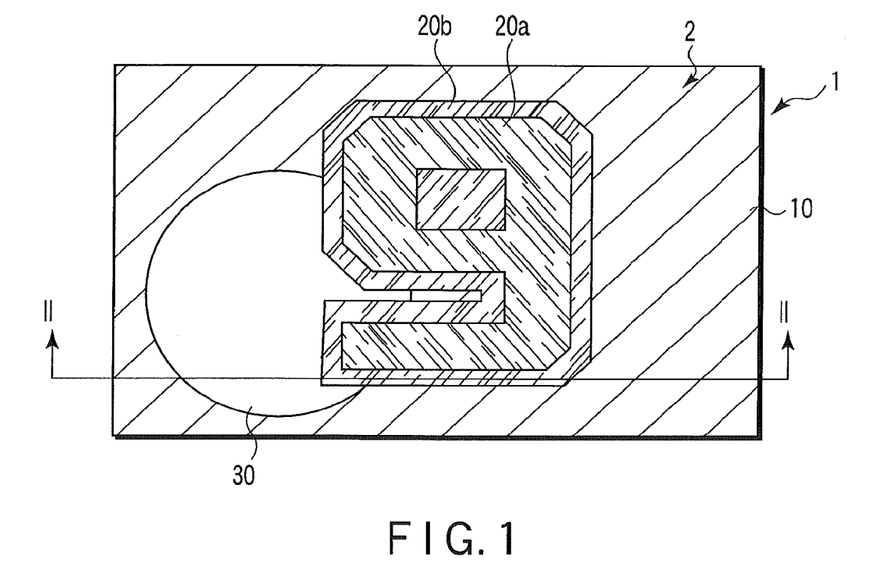
FIG. 1 is a plan view schematically showing a display according to a first embodiment of the present invention.
Figure 2:
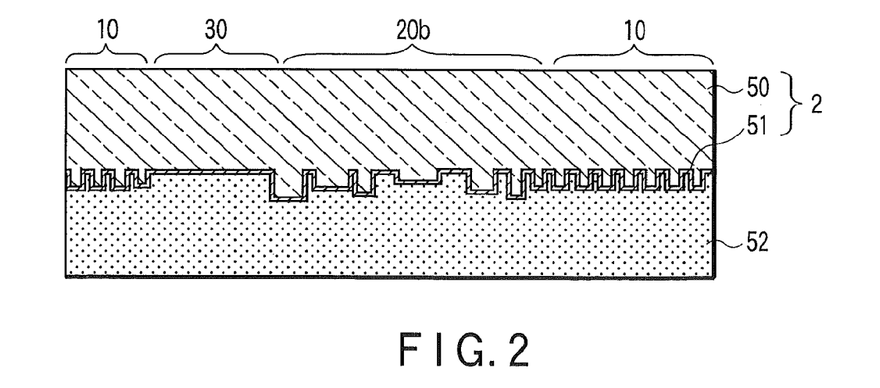
FIG. 2 is a schematic sectional view taken along the line II-II of the display shown in FIG. 1.

FIG. 1 is a plan view schematically showing a display according to a first embodiment of the present invention. FIG. 2 is a schematic sectional view taken along the line II-II of the display shown in FIG. 1.

A display 1 contains a layer 2. The layer 2 includes, for example, a light-transmitting material layer 50 and a reflective material layer 51. As shown in FIG. 2, an adhesive layer 52 can be provided on a surface of the reflective material layer 51 which is on an opposite side to the light-transmitting material layer 50. In an example shown in FIG. 2, a side on the light-transmitting material layer 50 is a front side and a side on the adhesive layer 52 is a back side.

The reflecting material layer 51 covers a back of the light-transmitting material layer 50. A relief structure is provided to an interface between the light-transmitting material layer 50 and the reflecting material layer 51. The relief structure will be described later. It suffices that the reflecting material layer 51 covers at least a region of the interface of the light-transmitting material layer 50 used for displaying an image by the relief structure. The adhesive layer 52 is provided on the reflecting material layer 51.

The light-transmitting material layer 50 plays a role as, for example, an underlayer of the reflecting material layer 51. The light-transmitting material layer 50 also plays a role of protecting the relief structure from contamination, flaw, etc. of the surface and thereby maintaining the visual effect of the display 1 for a long period. Furthermore, the light-transmitting material layer 50 prevents the relief structure from being exposed and makes its duplication difficult. Either of the light-transmitting material layer 50 and the reflecting material layer 51 may be omitted. In a case where the reflecting material layer 51 is omitted, in order that light reflects on the interface between the light-transmitting material layer 50 and the adhesive layer 52, it is good to make the difference in refractive index between the light-transmitting material layer 50 and the adhesive layer 52 greater or to form the adhesive layer 52 of a material having the reflectivity.

As the material of the light-transmitting material layer 50, thermoplastic resin, ultraviolet curing resin, etc. are suitable to form a relief structure by transfer using the master. In a case of using embossing, if the relief structure corresponding to a diffraction grating region 10 and light-scattering regions 20a and 20b to be described later is formed on the master with high accuracy, precise mass-produced copies can be easily obtained.

A structure of two or more layers may be employed for the light-transmitting material layer 50, in consideration of the surface strength and the ease of formation of the relief structure. In addition, in a case where metal is used as the material of the reflecting material layer 51, it is also possible to blend dye, etc. with the light transmitting material layer 50 and make the dye absorb light of a specific wavelength, to change a metallic luster color derived from the metal to a color different therefrom.

The reflecting material layer 51 plays a role of increasing the reflectivity of the interface where the relief structure is provided. As the material of the reflecting material layer 51, for example, metal materials such as Al, Ag, etc. can be used. In addition, the material of the reflecting material layer 51 may be a transparent material such as a dielectric material, etc. which has a refractive index different from that of the light-transmitting material layer 50. The reflecting material layer 51 may not only be a single layer, but also a multilayered film.

The adhesive layer 52 is provided to attach the display 1 to an article whose forgery should be prevented. The adhesive layer 52 may be formed of two or more layers, in consideration of the adhesive strength between the display 1 and the article whose forgery should be prevented, smoothness of the adhesive surface, etc.

FIG. 2 shows the structure of the display 1 to be observed from the side on the light-transmitting material layer 50, but the structure of the display 1 to be observed from the side on the reflecting material layer 51 can also be employed.

Next, the relief structure provided on the layer 2 will be described.

The layer 2 includes the diffraction grating region 10, the first light-scattering region 20a, the second light-scattering region 20b, and a region 30.

In the diffraction grating region 10, a diffraction grating pattern constituted by relief-type diffraction grating is formed on the interface between the light-transmitting material layer 50 and the reflecting material layer 51. The diffraction grating is constituted by, for example, arraying grooves. The term "diffraction grating" means a structure in which a diffracted wave is generated by radiating illumination light, and encompasses not only general diffraction grating in which, for example, grooves are arranged parallel at regular intervals, but also interference fringes recorded in a hologram. In addition, the groove or a portion sandwiched by the grooves is called "grating line".

A depth of the grooves forming the diffraction grating is set to be within a range of, for example, 0.1 to 1 μm. In addition, a grating constant of the diffraction grating is set to be within a range of, for example, 0.5 to 2 μm.

In each of the light-scattering regions 20a and 20b, linear protrusions and/or recesses aligned in similar directions are provided on the interface between the light-transmitting material layer 50 and the reflecting material layer 51. The directions of the linear protrusions and/or recesses in the region 20a are different from that in the region 20b.

If the region 20a or 20b is illuminated from a direction normal to the region, the region emits the scattered light with the widest angular range of emission, i.e., with the widest range of angle of divergence, in a plane perpendicular to the longitudinal direction of the linear protrusions and/or recesses, and emits the scattered light with the narrowest angular range of emission, in a plane which is parallel to the longitudinal direction of the linear protrusions and/or recesses and which is perpendicular to a main surface of the region. The angular range within which the light-scattering region emits the scattered light at a certain intensity or higher is hereinafter expressed by a term "light-scattering ability". In a case where, for example, the term "light-scattering ability" is used, the above optical characteristic can be described as "each of the regions 20a and 20b shows the minimum light-scattering ability in the longitudinal direction of the linear protrusions and/or recesses and shows the maximum light-scattering ability in the direction perpendicular thereto". In addition, a characteristic that a difference between the maximum light-scattering ability and the minimum light-scattering ability is sufficiently large is called "anisotropic light-scattering ability".

The length of the linear protrusions and/or recesses is set to be, for example, 10 μm or more. The width of the protrusions and/or recesses is set to be, for example, within a range of 0.1 to 10 μm. The height or depth of the protrusions and/or recesses is set to be, for example, within a range of 0.1 to 10 μm.

In the region 30, the relief structure is not provided on the interface between the light-transmitting material layer 50 and the reflective material layer 51. In other words, the interface between the light-transmitting material layer 50 and the reflecting material layer 51 is flat in the region 30.

The layer 2 can be constituted by, for example, segments corresponding to the regions 10, 20a, 20b and 30, respectively. Alternatively, the layer 2 may be constituted by cells arrayed in a matrix, the diffraction grating region 10 may be constituted by some of the cells, the region 20a may be constituted by some of the other cells, the region 20b may be constituted by some of the other cells, and the region 20b may be constituted of the remaining cells. In a case where the layer 2 is constituted by cells, an image can be displayed by using each of those cells as a pixel. The cells constituting the diffraction grating region 10 are hereinafter called "diffraction grating cells" and the cells constituting the regions 20a and 20b are hereinafter called "light-scattering cells".

In a case where the layer 2 is constituted by various types of cells, an image to be obtained by rearranging the cells can easily be expected if the visual effect of each of the cells is understood. For this reason, the cell to be used in each pixel can be easily determined from the digital image data. In this case, the display 1 can easily be therefore designed.

To make the visual effects of the segments or of the pixels different from each other, matters described below can be utilized.

First, the visual effect offered by the diffraction grating region 10 will be described with reference to the drawings.

Figure 3:
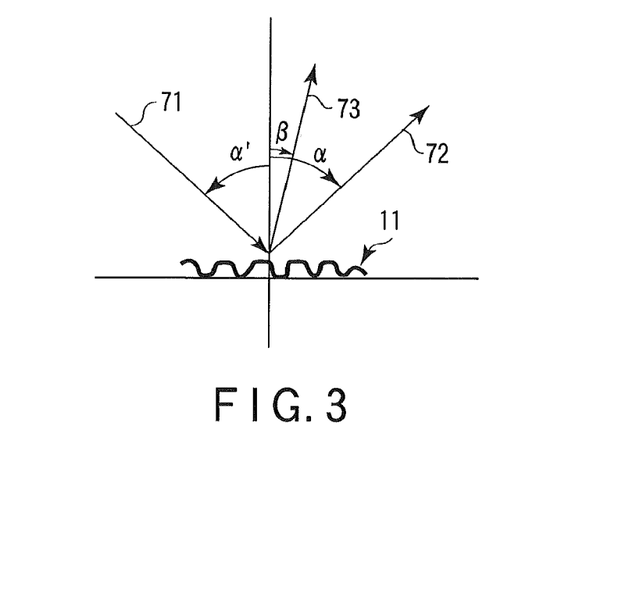
FIG. 3 is a view showing an example of a relationship between illumination light incident on a diffraction grating and diffracted light emitted from the diffraction grating.

FIG. 3 is a view showing an example of a relationship between the illumination light incident on a diffraction grating and the diffracted light emitted from the diffraction grating.

If illumination light 71 is made incident on diffraction grating 11 at an angle of incidence a' in a direction perpendicular to the grating lines, the diffraction grating 11 emits first-order diffracted light 73, which is typical diffracted light, at an angle of emergence β. A reflection angle or an angle of emergence α of light regular-reflected by the diffraction grating 11 (0-order diffracted light) 72 is equal to the incident angle α' in terms of absolute value, and symmetrical thereto about the normal line (for α, β, the clockwise direction is the positive direction). The angle α and the angle β fulfill a relationship represented in the following equation (1) where the grating constant of the diffraction grating 11 is d (nm) and the wavelength of the illumination light 71 is λ (nm).

$$d=\lambda/(\sin\alpha - \sin\beta) \quad (1)$$

As will be apparent from the above equation (1), if white light is made incident, the angle of emergence of the first-order diffracted light varies according to the wavelength. In other words, the diffraction grating 11 has a function of a spectroscope, and a color of the diffraction grating region 10 is changed iridescently when the position of observation is changed.

In addition, the color seen by an observer under a certain observation condition is changed according to the grating constant d.

For example, it is assumed that the diffraction grating 11 emits the first-order diffracted light 73 in a direction perpendicular to a plane of the grating. In other words, it is assumed that the angle β of emergence of the first-order diffracted light 73 is 0°. In this case, if the absolute values of the incident angle of the illumination light 71 and the angle of emergence of the 0-order diffracted light 72 are $\alpha_N$, the equation (1) is simplified as follows.

$$d=\lambda/\sin\alpha_N \quad (2)$$

As will be apparent from the equation (2), in order to make the observer see a certain color, the wavelength λ corresponding to the color, the absolute value $\alpha_N$ of the incident angle of the illumination light 71, and the grating constant d may be set to fulfill the relationship represented by the equation (2). For example, if the white light including rays having wavelengths of 400 to 700 nm is the illumination light 71, the absolute value $\alpha_N$ of the incident angle of the illumination light 71 is 45°, and a diffraction grating in which a spatial frequency of diffraction grating, i.e., an inverse of the grating constant ranges from 1,800 to 1,000/mm is used, the portion at which the spatial frequency is approximately 1,600/mm is seen blue-colored and the portion at which the spatial frequency is approximately 1,100/mm is seen red-colored. Therefore, by making the spatial frequencies of the diffraction gratings different between the segments or the cells, their display colors can be made different from each other.

The smaller the spatial frequency of the diffraction grating is, the easier the formation of the diffraction grating is. For this reason, the spatial frequency is set to be 500 to 1,600/mm in many of the general diffraction gratings used for the display.

In the above descriptions, it is assumed that the illumination light 71 is made incident on the diffraction grating 11 in the direction perpendicular to the grating lines. In such a situation, when the diffraction grating 11 is rotated around its normal line with the direction of observation unchanged, an effective value of the grating constant d is changed according to the rotation angle. As a result, the color seen by the observer is changed. If the rotation angle is sufficiently great, the observer can not see the diffracted light in the above direction of observation. For this reason, by making the segments or the cells have different orientations of the grating lines, their display colors can be made different from each other, and the direction in which the cells are seen brightly due to the diffracted light can be changed.

In addition, the diffraction efficiency is changed by making the depths of the grooves constituting the diffraction grating 11 great. And, the greater the area ratio of the diffraction grating with respect to the segments or cells is made, the greater the intensity of the diffracted light is.

Therefore, if the segments or cells are made to have different spatial frequencies and/or orientations of the diffraction grating, the colors displayed on the segments or cells can be made different from each other, and the conditions permitting the observation can be adjusted. Further, if the segments or cells are made different in at least one of the depths of the grooves forming the diffraction grating 11 and the area ratios of the diffraction grating 11 with respect to the segments or cells, the segments or cells can be made different in brightness. For this reason, by utilizing these, an image such as a full-color image, a stereoscopic image, etc. can be displayed.

Next, visual effects offered by the light-scattering regions 20a and 20b will be described with reference to the drawings.

Figure 4:
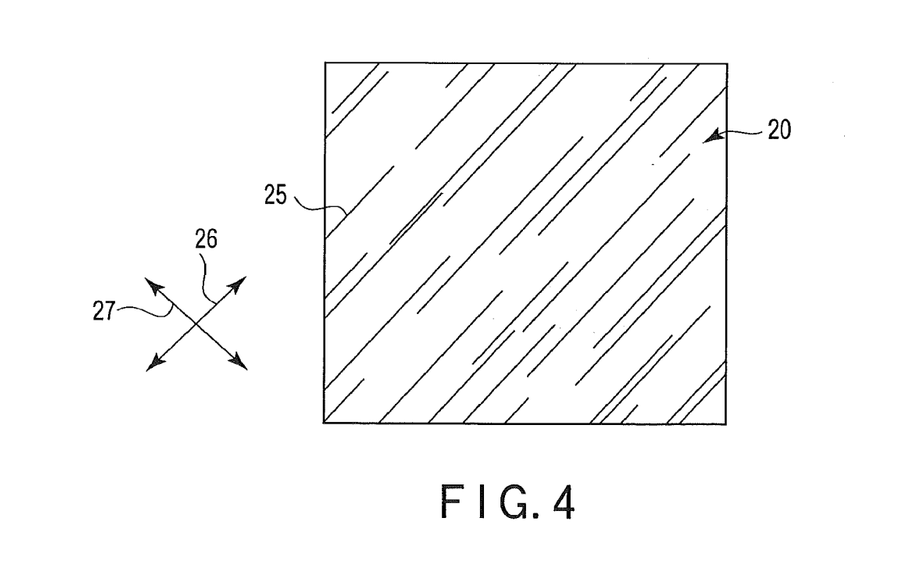
FIG. 4 is a plan view schematically showing an example of a light-scattering region.

FIG. 4 is a plan view schematically showing an example of a light-scattering region.

A light-scattering region 20 shown in FIG. 4 includes light-scattering structures 25. The light-scattering structures 25 are protrusions and/or recesses each having a linear shape and aligned in same directions in each light-scattering region 20. In other words, the light-scattering structures 25 are aligned substantially parallel with each other in each light-scattering region 20.

It is not necessary that the light-scattering structures 25 are aligned completely parallel with each other in each light-scattering region 20. As long as the light-scattering region 20 has a sufficient anisotropic light-scattering ability, for example, the longitudinal direction of some of the light-scattering structures 25 may cross the longitudinal direction of the other light-scattering structures 25 in this light-scattering region 20. Among directions parallel to the main surface of the light-scattering region 20, a direction in which the light-scattering region 20 represents a minimum light-scattering ability is hereinafter called "an orientational direction" and a direction in which the light-scattering region 20 represents a maximum light-scattering ability is hereinafter called "a light-scattering axis". In the present embodiment, since the basic structure is the linear structure, the orientational direction is orthogonal to the light-scattering axis.

In the light-scattering region 20 shown in FIG. 4, a direction denoted by arrow 26 is the orientational direction and a direction denoted by arrow 27 is the light-scattering axis. For example, when the light-scattering region 20 is illuminated in an oblique direction perpendicular to the orientational direction 26 and this light-scattering region 20 is observed from the front with an unaided eye, the light-scattering region 20 is seen comparatively brightly due to its high light-scattering ability. On the other hand, when the light-scattering region 20 is illuminated in an oblique direction perpendicular to the light-scattering axis 27 and this light-scattering region 20 is observed from the front with an unaided eye, the light-scattering region 20 is seen comparatively darkly due to its low light-scattering ability.

As will be apparent from above, for example, in a case where the light-scattering region 20 is illuminated in the oblique direction and this is observed from the front with an unaided eye, as the light-scattering region 20 is rotated about its normal line, brightness thereof is changed. For this reason, for example, if the same structures are employed in the light-scattering region 20a and the light-scattering region 20b shown in FIG. 1 and only a direction of the light-scattering axis in region 20a is made different from that of the light-scattering axis in region 20b, the region 20b is seen comparatively darkly when the region 20a is seen most brightly, and the region 20b is seen comparatively brightly when the region 20a is seen most darkly. In addition, the region 20a is seen comparatively darkly when the region 20b is seen most brightly, and the region 20a is seen comparatively brightly when the region 20b is seen most darkly.

In other words, by making the light-scattering axis 27 in the region 20a different from that of the region 20b, difference in brightness between them can be caused. Therefore, an image can be thereby displayed. In particular, by making an angle formed by the light-scattering axis 27 in the region 20a and that of the region 20b sufficiently great (for example, 30° or greater in a typical room in which illumination light sources are arranged on a ceiling, which depends the magnitude of the illumination light sources) or by making each anisotropic light-scattering ability sufficiently great, the images displayed on the respective regions can be observed with an unaided eye under different observation conditions. By employing the light-scattering structures in which the light-scattering axes are orthogonal to each other, similarly to the light-scattering regions 20a and 20b, the conditions for observing the images displayed on the respective regions are completely made different from each other, and the images can be certainly observed separately.

The brightness of the light-scattering region 20 can also be controlled in other manners.

For example, the greater the width of the light-scattering structures 25 is, the smaller the light-scattering ability in the direction of the light-scattering axis 27 is. On the other hand, the longer the light-scattering structures 25 are, the smaller the light-scattering ability in the orientational direction 26 is.

All the light-scattering structures 25 in a single light-scattering region 20 may have the same shape. Alternatively, protrusions and/or recesses 25 having different shapes may be present in a single light scattering-region 20.

When the light-scattering region 20 include only the light-scattering structures 25 having the same shape, the light-scattering ability can be designed easily. In addition, such a light-scattering region 20 can be formed with high accuracy and ease by using a fine processing device such as an EB writer, stepper, etc. On the other hand, when the light-scattering region 20 includes the light-scattering structures 25 having different shapes, scattered light having a gentle distribution of light intensity over a wide angular range can be obtained. For this reason, white color can be displayed stably with reduced variations of light-and-shade according to the observation position.

In addition, the higher the degree of orientational order of the light-scattering structures 25 is, the greater the anisotropic light-scattering ability of the light-scattering region 20 is.

In the light-scattering region 20, the light-scattering structures 25 may be arranged regularly to some extent or randomly. For example, if intervals of the light-scattering structures 25 in a direction parallel to the light-scattering axis 27 are set randomly, the light-intensity distribution of the scattered light in a direction perpendicular to the orientational direction 26 is gentle. Therefore, variation in whiteness and brightness according to the observation angle is restricted.

If the intervals among the light-scattering structures 25 in the directions parallel to the-light scattering axis 27 are made smaller, much more incident light can be scattered, and the intensity of the scattered light can be therefore made greater without degrading the anisotropic light-scattering ability. For example, if the average interval among the light-scattering structures 25 in the direction parallel to the light-scattering axis 27 is 10 μm or smaller, it is possible to obtain the light-scattering intensity sufficient to display an image with good visibility.

In a case where the light-scattering region 20 is constituted by light-scattering cells, if this average interval is made sufficiently small, it is sufficiently possible to set the size of the light-scattering cells at approximately 100 μm. In this case, images can be displayed with resolution equal to or higher than that of a human eye under general observation conditions. In other words, images with sufficiently high-resolution can be displayed.

Although two light-scattering regions 20a and 20b having the light-scattering axes approximately orthogonal to each other are arranged in FIG. 1, three or more light-scattering regions having light-scattering axes different from one another may be arranged.

Figure 5:
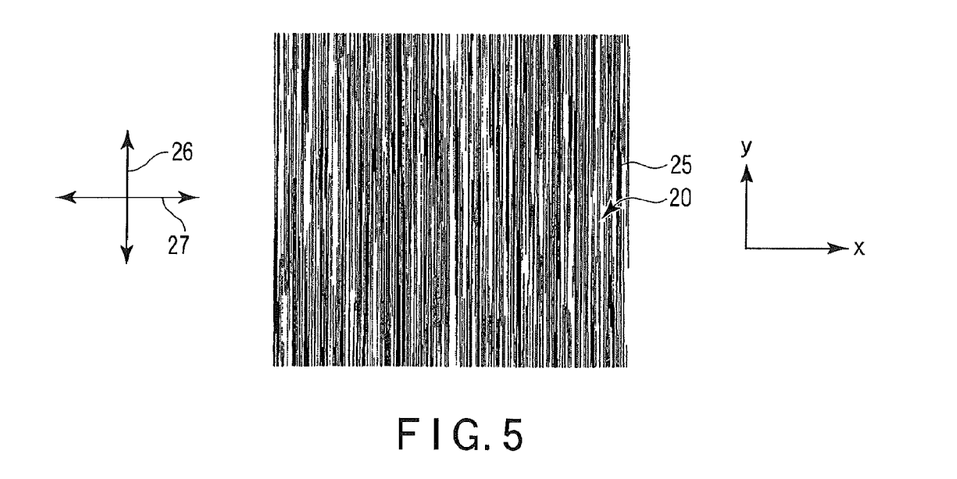
FIG. 5 is a plan view showing an example of a structure which can be employed in the light-scattering region.
Figure 6:
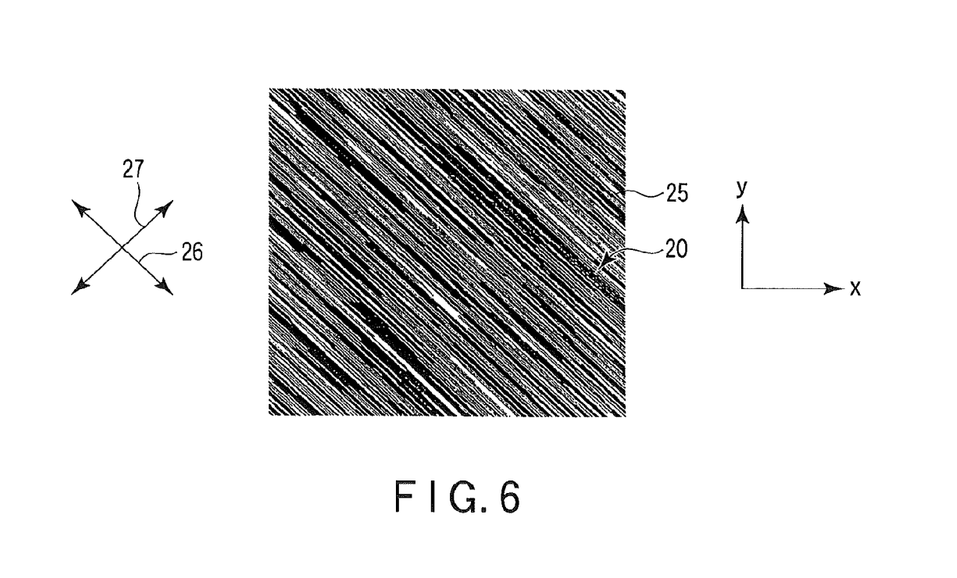
FIG. 6 is a plan view showing another example of a structure which can be employed in the light-scattering region.
Figure 7:
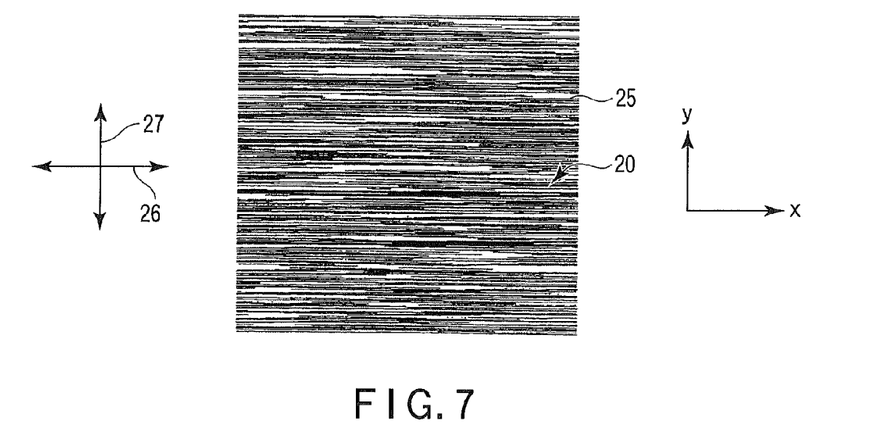
FIG. 7 is a plan view showing another example of a structure which can be employed in the light-scattering region.

FIGS. 5 to 7 are plan views showing examples of structures which can be employed in the light-scattering regions. In FIGS. 5 to 7, each white portion corresponds to a protrusion or a recess.

In the light-scattering region 20 shown in FIG. 5, the light-scattering structures 25 are oriented in y direction. In the light-scattering region 20 shown in FIG. 6, the light-scattering structures 25 are oriented in a direction that forms an angle of 45° in counterclockwise direction with respect to the y direction. In the light-scattering region 20 shown in FIG. 7, the light-scattering structures 25 are oriented in x direction orthogonal to the y direction.

Thus, if three or more light-scattering regions having light-scattering axes different from each other are arranged, for example, gradation can be displayed and the image change due to the change in the orientation of the display 1 can be made more complicated. For example, it is also possible to change the image as animation by changing the orientation of the display 1.

Figure 8:
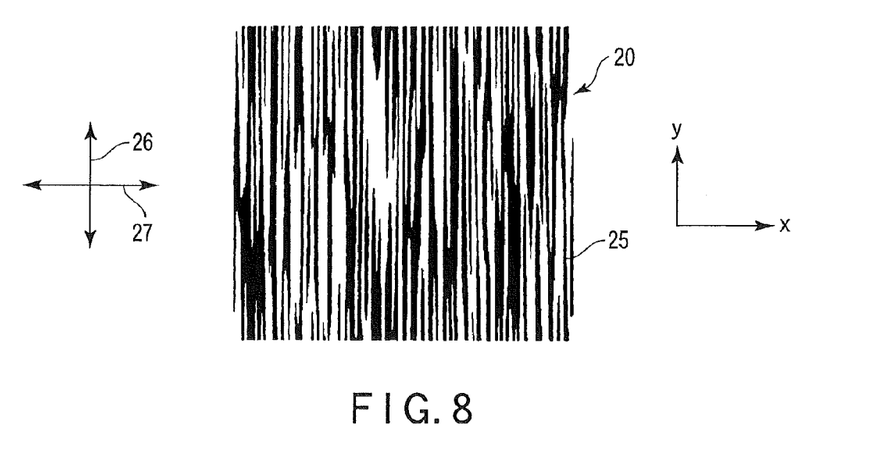
FIG. 8 is a plan view showing another example of a structure which can be employed in the light-scattering region.
Figure 9:
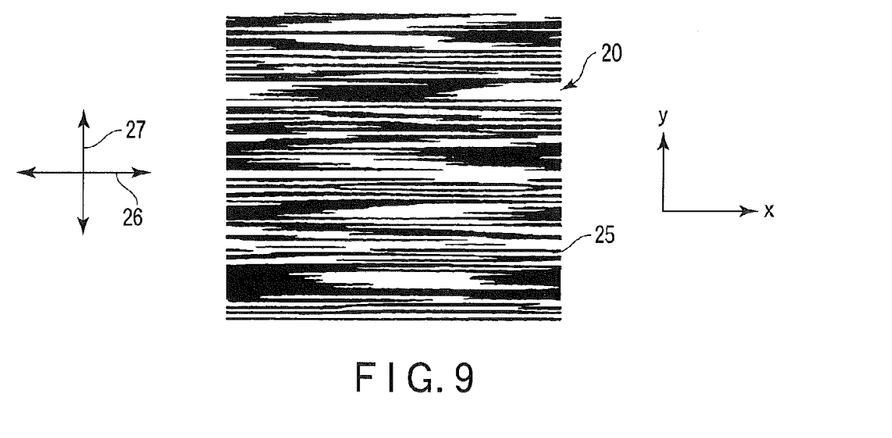
FIG. 9 is a plan view showing another example of a structure which can be employed in the light-scattering region.

FIGS. 8 and 9 are plan views showing other examples of the structure which can be employed in the light-scattering region.

In the light-scattering region 20 shown in FIG. 8, the light-scattering structures 25 are oriented in y direction. In the light-scattering region 20 shown in FIG. 9, the light-scattering structures 25 are oriented in x direction.

The light-scattering structures 25 shown in FIGS. 8 and 9 are wider than the light-scattering structures 25 shown in FIGS. 5 to 7. Therefore, the degree of divergence of the scattered light emitted from the light-scattering region 20 shown in FIGS. 8 and 9 in the direction perpendicular to the orientational direction 26 is lower than that of the scattered light emitted from the light-scattering region 20 shown in FIGS. 5 to 7.

In a case where the degree of divergence of the scattered light is low, the intensity of the scattered light observed at a specific position is high. Thus, an image formed by regions which have the same directions of the light-scattering axes 26 and have widths of the light-scattering structures 25 different from each other, for example, the light-scattering region 20 shown in FIG. 5 and the light-scattering region 20 shown in FIG. 8, is seen as an image with light and shade when observed at a predetermined position.

The light-scattering regions 20a and 20b shown in FIGS. 1 and 2 are not limited to the light-scattering regions 20 shown in FIGS. 5 to 7 and FIGS. 8 and 9, but may employ various structures.

As described above, the images displayed on the light-scattering regions 20a and 20b shown in FIG. 1 have a clear switching effect. In other words, two images displayed by two light-scattering regions 20a and 20b having light-scattering axes 27 different from each other are not seen as a single image, but can be clearly observed separately with an unaided eye. In addition, by providing the light-scattering regions 20 having light-scattering axes 27 different from each other, the same number of images as that of the provided light-scattering axes 27 can be displayed on the display 1. Thus, similar to an animation, an image can also be changed according to the change of the observation position.

The light-scattering structures 25 may have binary structures or may have continuously-varying structures in the depth or height direction.

The light-scattering region 20 including the light-scattering structures 25 having the binary structures can be produced with relative ease by a device having a fine processing ability, and a shape thereof, etc. can also be set easily. The light-scattering region 20 including the light-scattering structures 25 of the continuously-varying structures can be easily produced by recording a speckle in a photosensitive material, for example, photoresist by using the interference of the laser beam. When the area of the portion provided with the light-scattering structures 25 is 50% of the area of the light-scattering region 20 in the case of the binary structure, or alternatively when the area of the portion provide with the light-scattering structure 25 is 100% of the area of the light-scattering region 20, i.e., no flat surface is present in the case of the continuously-varying structure, the light-scattering structure in the light scattering region 20 has the highest scattering efficiency.

The layer 2 of the display 1 shown in FIGS. 1 and 2 includes two light-scattering regions 20a and 20b having light-scattering axes different from each other. The light-scattering region 20a displays a letter "9" as an image, while the light-scattering region 20b displays a marginal part of the letter "9" as an image.

In the display 1 shown in FIG. 1, the light-scattering axis of the region 20a is orthogonal to that of the region 20b. As described above, when the light-scattering region 20a or 20b is observed from a direction perpendicular to the orientational direction 26, a bright image can be seen irrespective of the observation angle since the display light is divergent. Therefore, if the display 1 is observed from the direction perpendicular to the orientational direction 26 of the light-scattering region 20a, the letter "9" alone is seen whitish and the marginal part thereof is seen darkly. On the other hand, if the display 1 is observed from the direction perpendicular to the orientational direction 26 of the light-scattering region 20b, the marginal part of the letter "9" alone is seen whitish. In other words, the light-and-shade of the light-scattering regions 20a and 20b is reversed according to the orientation of display 1, since the display 1 shown in FIG. 1 includes two light-scattering regions 20a and 20b having light-scattering axes different from each other.

Since the display 1 shown in FIGS. 1 and 2 includes two light-scattering regions 20a and 20b having light-scattering axes 27 whose directions are different from each other, predetermined images can be observed from different directions corresponding to the scattering axes, respectively. Although the similar change of the observed image according to the observation positions can be achieved by the diffraction grating region 10, substantially uniform white, unlike the iridescent appearance of the diffraction grating region 10, can be seen in a comparatively wide range of the observation positions.

In the above description, the white scattered light is described by exemplifying a case where the transmitting material layer 50 shown in FIG. 2 does not have a specific absorption band in the visible region. If the transmitting material layer 50 contains dye, etc., the scattered light from the light-scattering region 20 is the scattered light of wavelength components which pass through the transmitting material layer 50.

The display 1 shown in FIGS. 1 and 2 further includes the region 30 in which relief structures are not provided, besides the diffraction grating region 10 and the light-scattering regions 20a and 20b. The image observed on the region 30 is not changed even if the observation position is changed, except the position at which the regular-reflected light is observed. If the layer 2 is constituted by the transmitting material layer 50 and the reflecting material layer 51 shown in FIG. 2, the region 30 has a metallic appearance of the reflecting material layer 51.

In other words, the display 1 shown in FIGS. 1 and 2 has the complicated visual effects since the display 1 combines the diffraction grating region 10 which has a visual effect of greatly changing the appearance of the images according to the observation position, two light-scattering regions 20a and 20b which have the light-scattering axis 27 orthogonal to each other and have the image-switching effect and the stable observation effect, and the region 30 whose appearance is not changed according to the viewpoint. Furthermore, the display 1 shown in FIGS. 1 and 2 has further complicated visual effects as compared with a display which displays an image using either the diffraction grating region 10 or the light-scattering regions 20a and 20b, since the images are displayed separately on the respective regions. Therefore, distinction from an imitation can be executed with extremely ease and certainty, and the forgery-prevention effect is thereby enhanced.

The display 1 shown in FIGS. 1 and 2 can display various images different in color, brightness, etc. by arbitrarily designing each of the diffraction grating region 10 and the light-scattering regions 20a and 20b. Therefore, the diffraction grating region 10 and the light-scattering regions 20a and 20b can be designed in accordance with the colors and brightness of the images to be displayed. In addition, since the diffraction grating 11 and the light-scattering structures 25 are constituted by protrusions and recesses in the display 1 shown in FIGS. 1 and 2, the display 1 can be produced precisely and easily by merely duplicating the protrusions and recesses while maintaining the structures, positional relationship and functions thereof. The display 1 produced with high accuracy has the enhanced reliability on the display as a genuine article, and the certainty of the authenticity check thereof is enhanced.

Since the display 1 shown in FIGS. 1 and 2 includes the diffraction grating region 10 and the light-scattering regions 20a and 20b, the appearance of images is changed according to the observation position. This visual effect cannot be reproduced by color copying of the display 1. In addition, even if the display 1 shown in FIGS. 1 and 2 is to be forged or imitated, the precise relief structure having two different types of effects can hardly be reproduced exactly. Moreover, the light-scattering structure of the display 1 shown in FIGS. 1 and 2 cannot be duplicated by an optical duplication method using the diffracted light from the diffraction grating 11.

Thus, due to the characteristic visual effects and the difficulty in forgery and imitation, the display 1 shown in FIGS. 1 and 2 can be applied to, for example, securities, cards, passports, etc. as a high security optical medium whose authenticity check can be easily executed.

In the display 1 shown in FIGS. 1 and 2, the diffraction grating region 10 can be omitted. The display in which the diffraction grating region 10 is omitted has complicated visual effects since the display combines two light-scattering regions 20a and 20b which have the image-switching effect and the stable observation effect, and the region 30 whose appearance is not changed according to the viewpoint. This display has more complicated visual effects than a display which displays an image using one light-scattering region 20a or 20b, since the images are displayed separately in the respective regions. Therefore, distinction from an imitation can be executed with extremely ease and accuracy, and the forgery-prevention effect is thereby enhanced.

Next, another embodiment of the present invention will be described.

Figure 10:
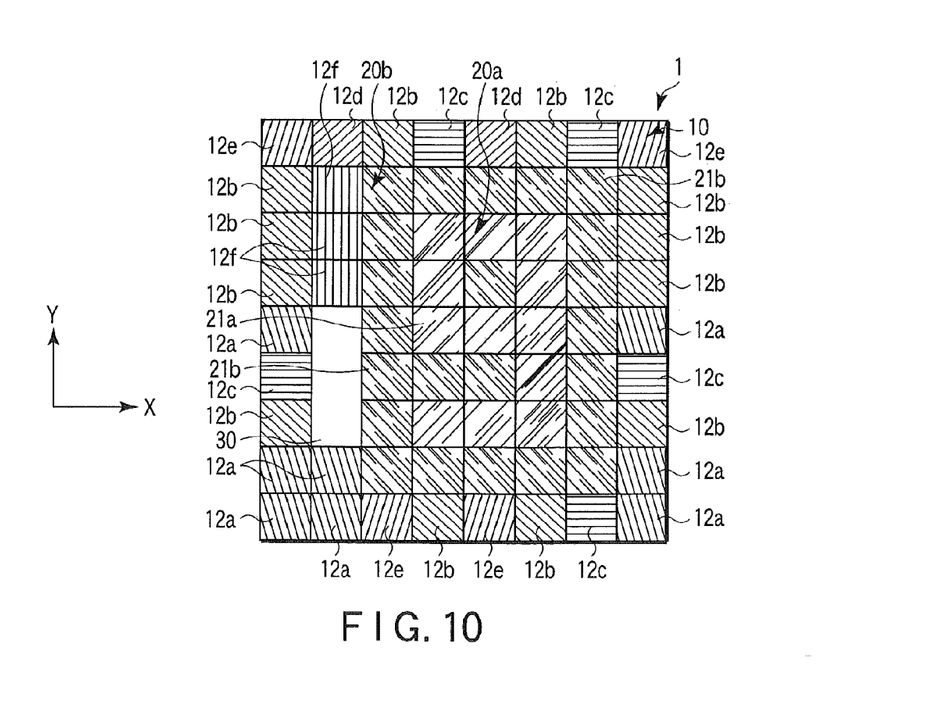
FIG. 10 is a plan view schematically showing a display according to a second embodiment of the present invention.

FIG. 10 is a plan view schematically showing a display according to a second embodiment of the present invention.

The display 1 shown in FIG. 10 is the same as the display 1 described with reference to FIGS. 1 and 2, except for employing the following structure. In the display 1 shown in FIG. 10, each of the diffraction grating region 10 and the light-scattering regions 20a and 20b is constituted by cells arrayed in matrix. In other words, in the display 1 shown in FIG. 10, cells as pixels display images in each of the regions.

In the display 1 shown in FIG. 10, the diffraction grating region 10 includes diffraction grating cells 12a to 12f having orientations different from one another.

Since the diffraction grating cells denoted by the same reference number in FIG. 10 are substantially the same in orientation of diffraction grating, the diffraction grating cells emit diffracted light according to the respective orientation. Therefore, the diffraction grating cells denoted by the same reference number display an image as pixels having the same visual effect. In contrast, since the diffraction grating cells 12a to 12f are different from each other in terms of orientation of diffraction grating, the diffraction grating cells 12a to 12f have visual effects different from one another. In other words, the display 1 shown in FIG. 10 includes six types of diffraction grating regions having different visual effects. Therefore, the diffraction grating regions of the display shown in FIG. 10 variously change their appearance according to the observation conditions.

In the display 1 shown in FIG. 10, the light-scattering region 20a is constituted by light-scattering cells 21a in which the orientational direction of the light-scattering structure is parallel to the direction that forms an angle of 45° in counterclockwise direction with respect to the x direction. The light-scattering region 20a forms the image of "9" by using light-scattering cells 21a as pixels. On the other hand, the light-scattering region 20b is constituted by light-scattering cells 21b in which the orientational direction of the light-scattering structure is orthogonal to the orientational direction of the light-scattering structure included in the light-scattering cells 21a. The light-scattering region 20b forms a marginal part of the image "9" displayed on the light-scattering region 20a by using light-scattering cells 21b as pixels.

In the light-scattering regions 20a and 20b of the display 1 shown in FIG. 10, since the orientational directions of the light-scattering structures in the light-scattering cells 21a and 21b constituting the regions are orthogonal to each other, the light-scattering axes are orthogonal to each other. Therefore, if the display 1 shown in FIG. 10 is illuminated from the direction that forms an angle of 45° in counterclockwise direction with respect to the x direction and observed from its front, the scattered light is intensely observed at the light-scattering region 20b, whereas the scattered light is not observed or observed extremely weakly at the light-scattering region 20a. Thus, the image "9" is seen darkly. If the display 1 shown in FIG. 10 is illuminated from the direction that forms an angle of 45° in clockwise direction with respect to the x direction and observed from its front, the scattered light is intensely observed at the light-scattering region 20a and the scattered light is not observed or observed extremely weakly at the light-scattering region 20b. Thus, an image in which the image "9" is seen whitish and the marginal part thereof is seen darkly is displayed. In other words, the light-and-shade of the image "9" and the marginal part thereof are reversed every time the angle of illumination is turned at 90°.

The sizes of the diffraction grating cells 12a to 12f and the light-scattering cells 21a and 21b are preferably 300 µm or smaller. In particular, when the display 1 is small, the sizes are preferably 100 µm or smaller in consideration of a situation in which the display may be observed very closely. If the size of each of the cells is equal to or smaller than these numerical values, the cells cannot be distinguished from each other under the normal observation conditions with an unaided eye, and enhancement of the forgery-prevention effect and enhancement of the design and decoration can be obtained.

The sizes of the diffraction grating cells 12a to 12f and the light-scattering cells 21 and 21b are preferably the same. By using the cells having the same size as pixels, the images of the display 1 can be easily formed from the image data.

As described above, the display 1 shown in FIG. 10 has more complicated visual effects than a display which displays an image with one or two of the diffraction grating region 10 and the light-scattering regions 20a and 20b, since the diffraction grating region 10, which is constituted by the diffraction grating cells 12a to 12f having the orientations different from one another, and the two light-scattering regions 20a and 20b, which are constituted by the respective light-scattering cells 21a and 21b having the light-scattering axes 27 orthogonal to each other, separately display images. Therefore, distinction from an imitation can be thereby executed with extreme-ease and certainty.

In addition, since the display 1 shown in FIG. 10 forms the images by using the diffraction grating cells 12a to 12f and the light-scattering cells 21a and 21b as pixels, the diffraction grating and the light-scattering structure for each pixel can be easily arranged from the digital image data, and the images of the display 1 can be easily made complicated and highly fine. Thus, the visual effect can be enhanced and the forgery-prevention effect is further enhanced.

In addition, since both the diffraction grating 11 and the light-scattering structure 25 are constituted by protrusions and recesses, in the display 1 shown in FIG. 10, it can be produced precisely and easily by merely duplicating the protrusions and recesses while maintaining the structures, positional relationship and functions thereof. As described above, the display 1 produced with high accuracy has the enhanced reliability on the display as a genuine article, and the certainty in the authenticity check is enhanced.

Furthermore, even if the display 1 shown in FIG. 10 is to be forged or imitated, the precise structure having these visual effects can hardly be reproduced exactly. Moreover, the light-scattering structure of the display 1 shown in FIG. 10 cannot be duplicated by an optical duplication method using the diffracted light from the diffraction grating 11.

Thus, due to the characteristic visual effects and the difficulty in forgery and imitation, the display 1 shown in FIG. 10 can be therefore applied to, for example, securities, cards, passports, etc. as a high security optical medium whose authenticity check can be easily executed.

A modified example of the display 1 shown in FIG. 10 will be described.

Figure 11:
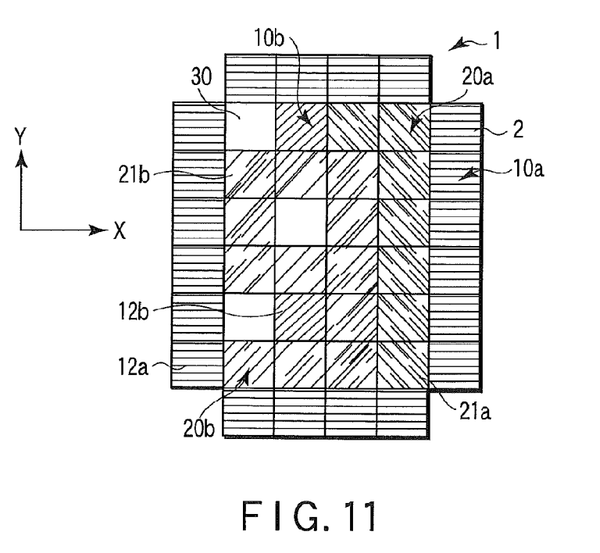
FIG. 11 is a plan view schematically showing a modification of the display shown in FIG. 10.

FIG. 11 is a plan view schematically showing a modification of the display shown in FIG. 10.

The display 1 shown in FIG. 11 is the same as the display 1 described with reference to FIG. 10, except for employing the following structure. In other words, the layer 2 of the display shown in FIG. 11 includes two diffraction grating regions 10a and 10b having orientations different from each other, two light-scattering regions 20a and 20b having light-scattering axes orthogonal to each other, and the region 30 in which the relief structure is not provided.

In the display 1 shown in FIG. 11, the diffraction grating region 10a constituted by the diffraction grating cells 12a forms an image "0", the diffraction grating region 10b constituted by the diffraction grating cells 12b forms an image ":", the light-scattering region 20a constituted by the light-scattering cells 21a forms an image "1", the light-scattering region 20b constituted by the light-scattering cells 21b forms an image "9".

In the display 1 shown in FIG. 11, the light-scattering axis of the light-scattering region 20a is approximately orthogonal to that of the light-scattering region 20b. Therefore, only one of the images is observed at a certain observation position and the other image alone is observed at the other observation positions. In other words, it is impossible to observe both the images of the light-scattering region 20a and the light-scattering region 20b.

In addition, in the display 1 shown in FIG. 11, orientation of diffraction gratings of the diffraction grating region 10a is different from that of the diffraction grating region 10b. Therefore, an observation position at which the diffraction grating region 10a is seen iridescently is different from an observation position at which the diffraction grating region 10b is seen iridescently.

Furthermore, in the display 1 shown in FIG. 11, since relief structures in the diffraction grating region 10b and the light-scattering region 20b are oriented in substantially the same directions, both images of the regions are observed or the only one of the images is observed according to the observation position.

The display 1 shown in FIG. 11 includes the region 30 in which the diffraction grating or the light-scattering structure is not provided. The appearance of the region 30 is not changed according to the observation position.

As described above, the display 1 shown in FIG. 11 has more complicated visual effects than a display in which one or more of these regions are omitted since the two diffraction grating region 10a and 10b, which are constituted by the respective diffraction grating cells 12a and 12b having the orientations different from each other, and two light-scattering regions 20a and 20b, which are constituted by the respective light-scattering cells 21a and 21b having the light-scattering axes 27 orthogonal to each other, display images separately. Distinction from an imitation can be thereby executed with extremely-ease and certainty.

In addition, since both the diffraction grating 11 and the light-scattering structure 25 are constituted by protrusions and recesses in the display 1 shown in FIG. 10, the display 1 can be produced with accuracy and ease by merely duplicating protrusions and recesses while maintaining the structures, positional relationship and functions thereof. The display 1 produced with stability and high accuracy has the enhanced reliability on the display as a genuine article, and the certainty in the authenticity check is enhanced.

Furthermore, even if the display 1 shown in FIG. 11 is to be forged and imitated, the precise structure having these visual effects can hardly be reproduced exactly. Moreover, the light-scattering structure of the display 1 shown in FIG. 11 cannot be duplicated by an optical duplication method using the diffracted light from the diffraction grating 11.

Thus, due to the characteristic visual effects and the difficulty in forgery and imitation, the display 1 shown in FIG. 11 can be therefore applied to, for example, securities, cards, passports, etc. as a highly security optical medium whose authenticity check can be easily executed.

Besides the light scattering-regions 20a and 20b including the linear light-scattering structures, the above-described display 1 may further include a light-scattering region including protrusions and/or recesses having other shapes.

Figure 12:
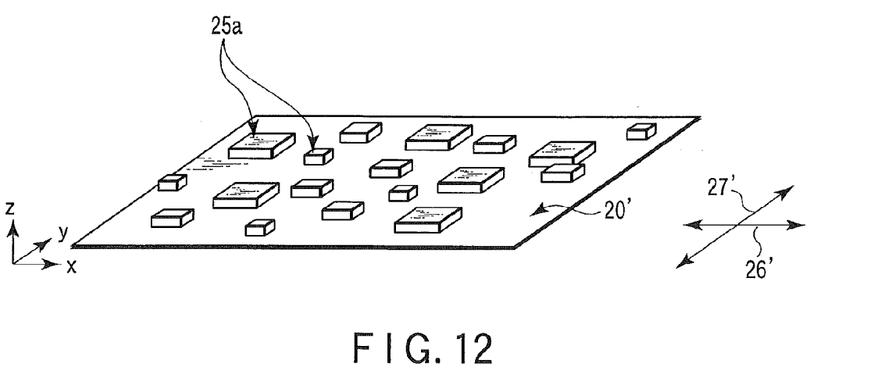
FIG. 12 is a perspective view schematically showing an example of a light-scattering region including protrusions and/or recesses having a shape other than a linear shape.
Figure 13:
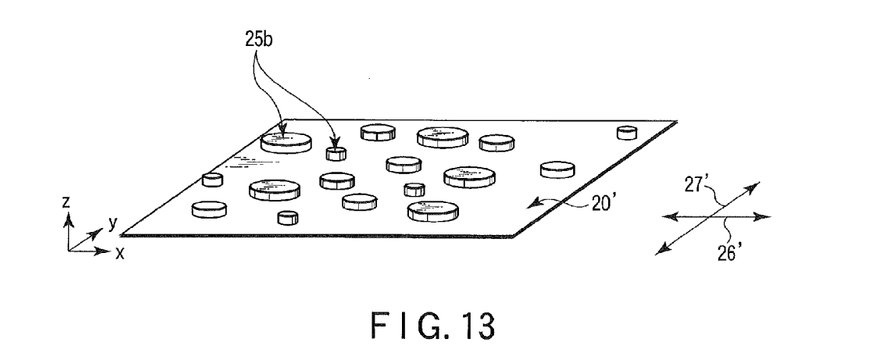
FIG. 13 is a perspective view schematically showing another example of a light-scattering region including protrusions and/or recesses having a shape other than a linear shape.

FIGS. 12 and 13 are perspective views schematically showing an example of a light-scattering region including protrusions and/or recesses having shapes other than the linear shape.

A light-scattering region 20' shown in FIG. 12 includes protrusions 25a each having a shape of a rectangular parallelepiped. An orientational direction 26' of the protrusions 25a is approximately parallel to x direction. A light-scattering region 20' shown in FIG. 13 includes protrusions 25b each having a shape of an ellipse. An orientational direction 26' of the protrusions 25b is approximately parallel to x direction.

In the light-scattering regions 20' shown in FIGS. 12 and 13, a light-scattering axis 27' is approximately parallel to y direction. However, the protrusions 25a and 25b included in the light-scattering region 20' shown in FIGS. 12 and 13 have smaller anisotropic light-scattering ability as compared with the above-described linear protrusions and/or recesses 25, since the ratio of the dimension in the x direction with respect to the dimension in the y direction is small, for example, within a range of 1 to 5. Therefore, in the light-scattering regions 20' shown in FIGS. 12 and 13, the scattered light is observed but the change in appearance according to the observation position is small.

Therefore, the visual effects of the display 1 can be made further complicated by adding the light-scattering region 20'.

The above-described display 1 can also be attached to an article such as a printed articles, etc. and used as a forgery-preventing medium.

Figure 14:
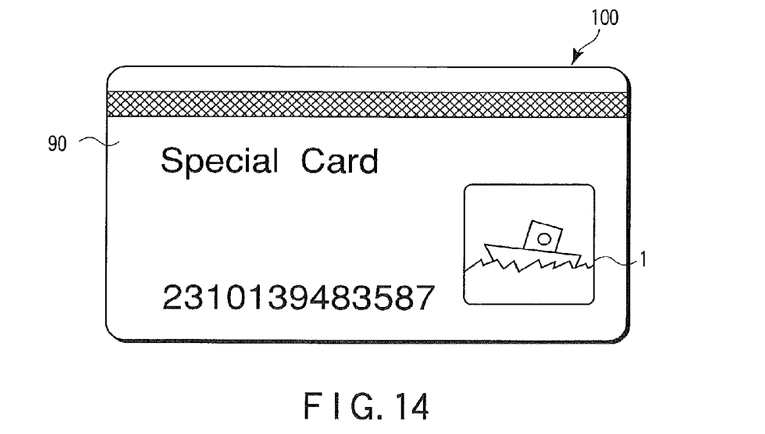
FIG. 14 is a plan view schematically showing an example of an article which supports a display.

FIG. 14 is a plan view schematically showing an example of a labeled article which supports the display.

A labeled article 100 shown in FIG. 14 is a magnetic card. The labeled article 100 includes a printed substrate 90, and a display 1 supported by the substrate 90. The display 1 included in the labeled article 100 is the above-described display 1.

The labeled article 100 shown in FIG. 14 can be easily distinguished from a non-genuine article since images of the display 1 having the visual effects of the diffraction grating region and the visual effect of the light-scattering regions and images formed by the printing on the card 90, i.e., the displayed images constituted by a plurality of elements having different optical characteristics, can be confirmed visually. Since the forgery and imitation of the display 1 are difficult as described above, the forgery-prevention effect of the labeled article 100 can be expected.

The labeled article shown in FIG. 14 is one of examples of application of the display 1, and the application of the display 1 is not limited to the example of FIG. 14. For example, when the display 1 is applied to an article such as a printed article, it may be embedded into paper in the form of thread (also called strip, filament, thread-like object, security band, etc.). In addition, since the display 1 can include an adhesive layer 52 as shown in FIG. 2, it can be easily applied to various articles by sticking it onto the various articles.

In addition, it is not necessary that the labeled article is a printed article. In other words, the display 1 may be supported by high-grade articles such as art objects, etc.

The display 1 may be used for the purpose other than the forgery-prevention. For example, it can also be utilized as a toy, a teaching material, a decorative article, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display comprising:
    a first light-scattering region provided with first linear protrusions or recesses having the same longitudinal direction and each configured to emit white scattered light in a plane perpendicular to the longitudinal direction when illuminated with white light in a direction normal to the first light-scattering region, the first linear protrusions or recesses being discontinuous in the longitudinal direction thereof; and
    a second light-scattering region provided with second linear protrusions or recesses having the same longitudinal direction different from the longitudinal direction of the first linear protrusions or recesses and configured to emit white scattered light in a plane perpendicular to the longitudinal direction of the second linear protrusions or recesses when illuminated with white light in a direction normal to the second light scattering region, the second linear protrusions or recesses being discontinuous in the longitudinal direction thereof,
    wherein in at least one of the first and second light-scattering regions, the linear protrusions or recesses are arranged at random,
    wherein at least one of the first and second light-scattering regions includes first and second cells different from each other in at least one of length and width of the protrusions or recesses, the first and second cells being configured to emit the scattered light at first and second degrees of divergence, respectively, such that an image informed by the first and second cells is seen as an image with light and shade.

2. The display according to claim 1, wherein the display comprises the first and second light-scattering regions in the same plane.

3. The display according to claim 1, wherein:
    the first light-scattering region forms an image,
    the second light-scattering region forms a marginal part of the image,
    the marginal part of the image extends along the entire perimeter of the image formed by the first light-scattering region, and the image formed by the first light-scattering region and the marginal part of
    the image formed by the second light-scattering region are distinguishable from each other with an unaided eye.

4. The display according to claim 1, wherein in each of the first and second light-scattering regions, the linear protrusions or recesses are arranged at random.

5. The display according to claim 1, wherein in at least one of the first and second light-scattering regions, the linear protrusions or recesses have the same length and width.

6. The display according to claim 1, wherein in at least one of the first and second light-scattering regions, an average interval among the protrusions or recesses is equal to or smaller than 10 μm.

7. The display according to claim 1, wherein the longitudinal direction in the first light-scattering region and the longitudinal direction in the second light-scattering region are orthogonal to each other.

8. The display according to claim 1, further comprising a diffraction grating region provided with a relief structure which forms a diffraction grating.

9. The display according to claim 8, wherein:
    each of the first and second light-scattering regions includes an array of cells each provided with the protrusions or recesses, and
    the diffraction grating region includes an array of cells each provided with the relief structure.

10. The display according to claim 9, wherein:
    in at least one of the first and second light-scattering regions, the cells included in the light-scattering region include cells different in at least one of density, size, shape, and depth or height of the protrusions or recesses, and an area ratio of a portion provided with the protrusions or recesses with respect to the cell, and
    the cells included in the diffraction grating region include cells different in at least one of spatial frequency, orientation, and depth or height of grooves forming the diffraction grating, and an area ratio of the diffraction grating with respect to the cell.

11. The display according to claim 1, further comprising a light-scattering region provided with protrusions or recesses having planar shapes of circles, ellipses or polygons.

12. The display according to claim 1, wherein the first and second light scattering regions are regions included in a main surface of a layer made of a light-transmitting material, and the display further comprises a reflective layer or a semitransparent reflective layer covering the main surface.

13. A labeled article comprising:
    the display according to claim 1; and
    an article supporting the display.

14. A display comprising:
    a first light scattering region provided with first linear protrusions or recesses having the same longitudinal direction and each configured to emit white scattered light in a plane perpendicular to the longitudinal direction when illuminated with white light in a direction normal to the first light-scattering region, the first linear protrusions or recesses being discontinuous in the longitudinal direction thereof; and
    a second light-scattering region provided with second linear protrusions or recesses having the same longitudinal direction different from the longitudinal direction of the first linear protrusions or recesses and configured to emit white scattered light in a plane perpendicular to the longitudinal direction of the second linear protrusions or recesses when illuminated with white light in a direction normal to the second light-scattering region, the second linear protrusions or recesses being discontinuous in the longitudinal direction thereof, wherein the first light-scattering region forms an image and the second light-scattering region forms a marginal part of the image, wherein in at least one of the first and second light-scattering regions, the linear protrusions or recesses are arranged at random, wherein at least one of the first and second light-scattering regions, includes first and second cells different from each other in at least one of length and width of the protrusions or recesses, the first and second cells being configured to emit the scattered light at first and second degrees of divergence, respectively, such that an image formed by the first and second cells is seen as an image with light and shade.

15. The display according to claim 14, wherein the image formed by the first light-scattering region and the marginal part of the image formed by the second light-scattering region are distinguishable from each other with an unaided eye.

* * * * *